Aug. 9, 1949.  E. T. REID  2,478,424
BOAT CARRIER TRAILER
Filed June 12, 1946  2 Sheets-Sheet 1
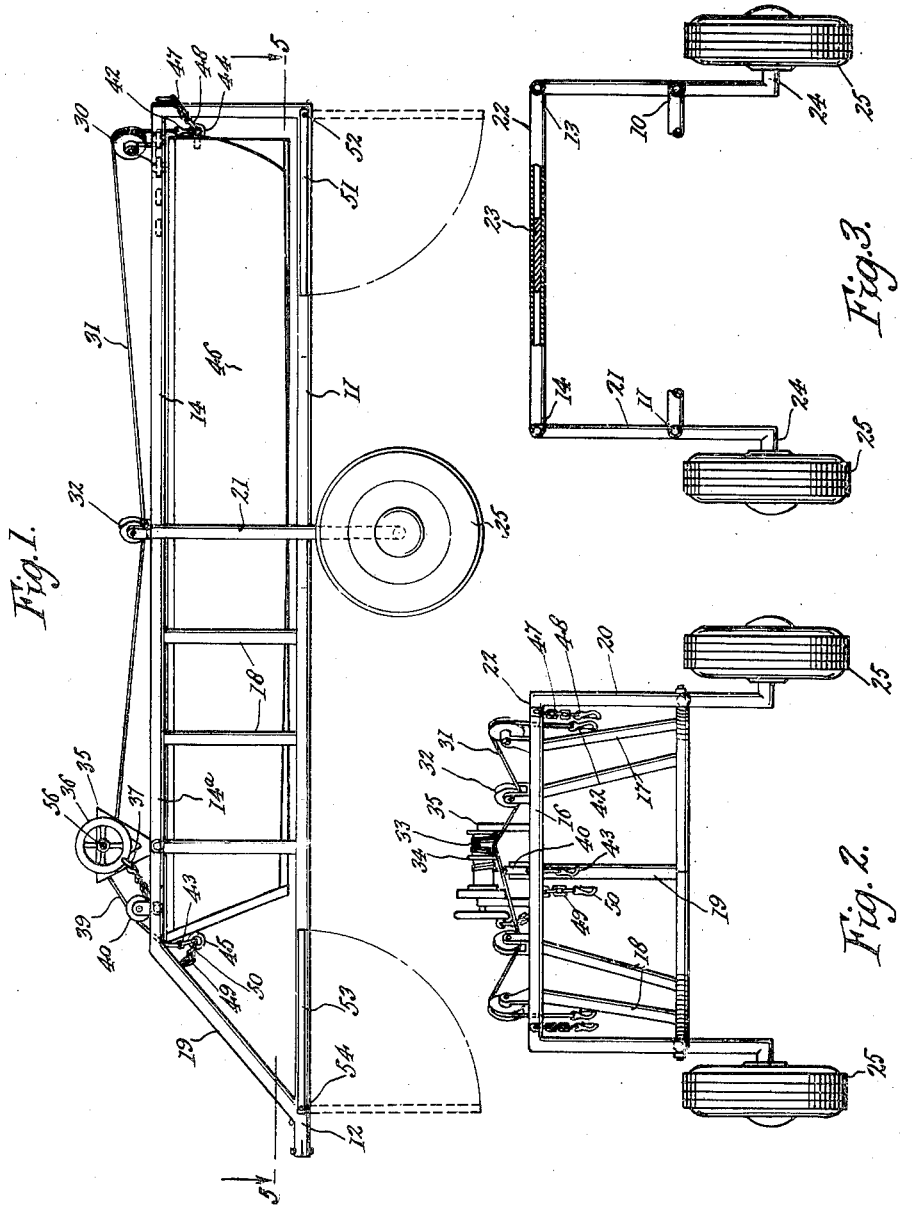
INVENTOR.
Eugene T. Reid
BY
Mawhinney & Mawhinney
Attorneys

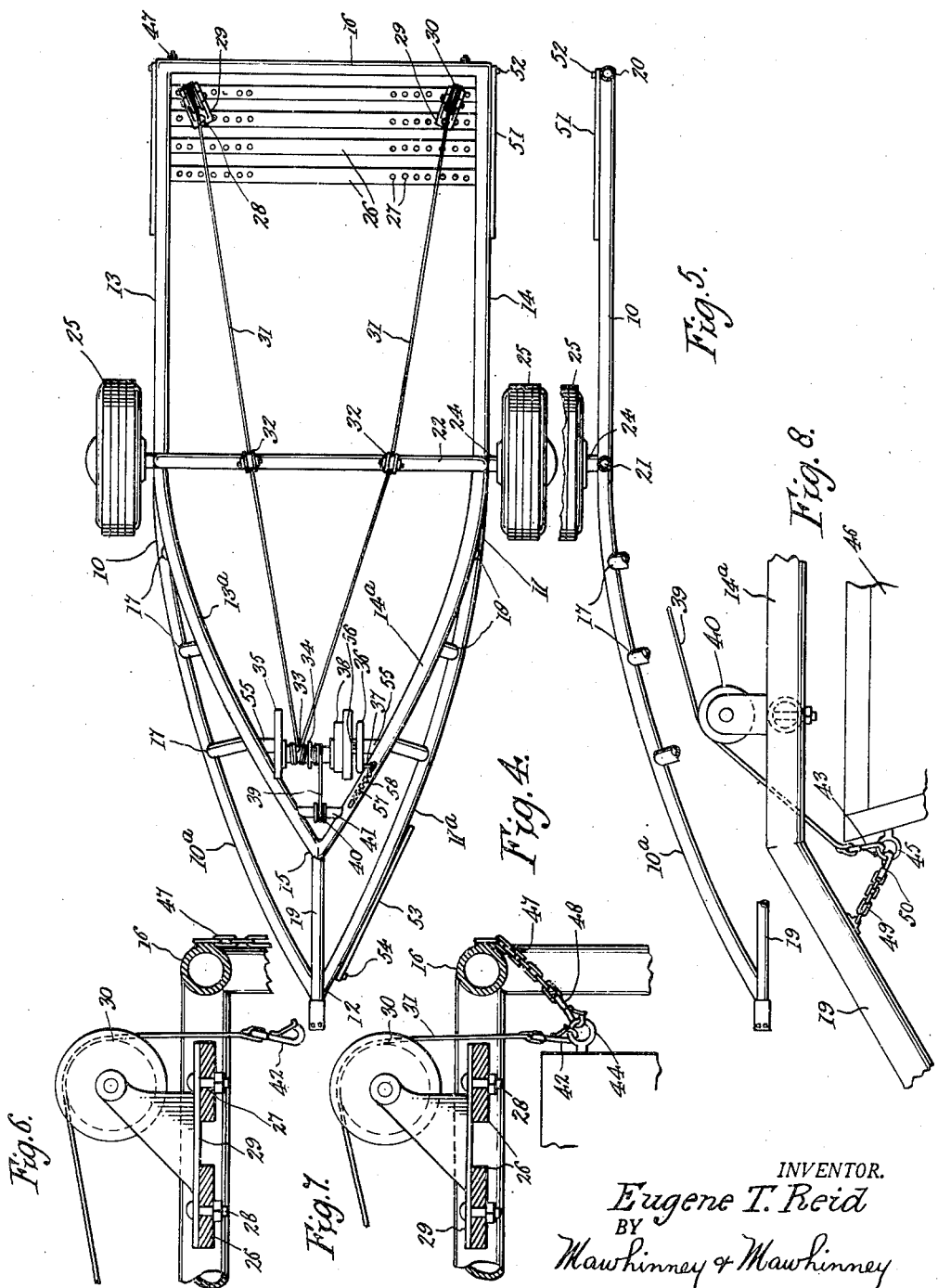

Patented Aug. 9, 1949

2,478,424

UNITED STATES PATENT OFFICE 2,478,424

BOAT CARRIER TRAILER

Eugene T. Reid, Bay Minette, Ala.

Application June 12, 1946, Serial No. 676,266

2 Claims. (Cl. 254—139.1)

The present invention relates to improvements in boat-carrier trailers, and has for an object to provide an improved trailer to be pulled by an automobile, tractor or the like and so constructed and arranged as to receive and support therein a boat or skiff whereby the latter may be conveniently transported from place to place.

Another object of the invention is to provide an improved trailer having built into the construction thereof hoisting mechanism by which the boat may be raised into its appointed space within the trailer by the action of a single person, and whereby the boat may be lowered to the ground at its destination in the same facile and convenient manner.

Another object of the invention is to provide an improved trailer so constructed and arranged as to hoist and receive the boat, transport it and subsequently lower and release the boat at destination without involving the necessity of removing any equipment in or upon the boat, such as outboard motors which, however, for safety purposes, could be simply detached and placed inside the boat where it will receive the protection of the hull of the boat.

A further object of the invention is to provide an improved trailer which will be of a strong and rigid construction resistant to warping or deformation and at the same time being of an open work construction particularly at the base thereof in order that the trailer may be backed over the boat while the latter rests upon the ground, allowing an entire open space and freeway for the boat to move vertically upward into the confines of the skeleton framework which constitutes the trailer frame.

A still further object of the invention is to provide an improved trailer having installed thereon a hoist mechanism equipped with steel cable and reduction gear to produce adequate power for the raising and handling of the boat.

A still further object of the invention is to provide a trailer frame of such construction and weights as to constitute a safe construction to the end that persons involved in the transportation may ride in the boat while it is being wheeled along in the trailer and with entire safety.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side elevational view of an improved trailer constructed in accordance with the present invention and showing a boat suspended therein.

Figure 2 is a rear elevation of the same taken from the right hand end of Figure 1.

Figure 3 is an elevation of a detail of the arched axle and wheel support with parts broken away and parts shown in section.

Figure 4 is a top plan view of the improved trailer with the boat removed.

Figure 5 is a horizontal section taken on the line 5—5 in Figure 1;

Figure 6 is a fragmentary vertical section, taken on an enlarged scale, through the rear portion of the upper frame showing the adjustable hoisting mechanism in operative position;

Figure 7 is a similar view showing the operative position of the same and of the suspension mechanism connected to a boat, and Figure 8 is a fragmentary side elevation, taken on an enlarged scale, of the front portion of the upper frame and the boat showing the hoisting and suspending mechanisms connected thereto.

Referring more particularly to the drawings, the trailer is composed generally of two skeleton frames, namely a lower and an upper frame with suitable uprights to connect the two frames together and with an arched axle support at the central portion of the trailer which may be connected to both frames.

The lower frame is comprised of the two spaced substantially parallel side rails 10 and 11 which are unconnected at their rear ends or at any intermediate point but have their front portions bowed together as indicated at 10a and 11a, the bowed ends meeting in the junction point 12.

The upper frame is composed of spaced and parallel side rails 13 and 14 having forward bowed portions 13a and 14a meeting at the front junction end 15. The side rails 13 and 14 of the upper frame are also connected together at their rear ends by a rear cross rail 16.

The upper frame is preferably shorter than the lower frame, the bow of the upper frame being set back appreciably from the bow 10a, 11a of the lower frame.

The two frames are connected together by the upright lateral ribs 17 and 18 and by the bow rib 19 which connects the junction points 12 and 15 of the two frames this bow rib 19 being on an inclination as seen to advantage in Figure 1 on account of the offsetting of the bow portions of the two frames as above referred to. At their rear ends the two frames are connected by the rear corner uprights 20.

The arched axle support is composed, as illustrated more particularly in Figure 3, of the vertical legs 21 and the cross axle 22. Where the frames and arched axle are made of tubular metal, the cross axle 22 may be reinforced by a bar 23 if desired. At the lower ends of the vertical legs 21 are outturned trunnions 24 on which the ground wheels 25 are mounted.

Between the rear end portion of the side rails 13 and 14 of the upper frame are a number of cross bars 26, in Figure 4 shown to be four in number, and having series of perforations 27 at both end portions to selectively receive therethrough the bolts 28 on the bases 29 of the two pulleys 30. These pulleys receive the two steel cables 31 which converge forwardly from the pulleys 30 to idler pulleys 32 located more closely together upon the cross axle 22. From the idlers 32 the two steel cables 31 converge forward to one section 33 of a double windlass drum having the partition 34 for separating such sections. The drum is journaled for rotation upon the supports 35 which may be of the triangular shape shown in Figure 1 and these supports have feet 55 connecting them with the bowed front ends 13a and 14a of the upper frame. In fact the bowed portions 13a, 14a together with the junction 15 in combination with the cross structure involving the supports 35, feet 55 and the drum structure, all unite to produce an extremely strong truss at the forward portion of the upper frame serving to reinforce both the upper frame and the drum supporting structure which receives the weight of the boat in the hoisting operation. It will be noted also that certain of the upright lateral ribs 17 and 18 are in substantial alignment with the feet 55 so that any stresses or strains may be translated from the drum to the feet to the upper frame and thence through the forward upright lateral ribs 17 to the bowed portion 10a, 11a of the lower frame. In this way the load is distributed to both frames.

The drum may be rotated by a handle 37 on a balance wheel 36 carried by the reduction gear shaft 56. The reduction gear is indicated at 38 and is of any well known form. A forward steel cable 39 is wound upon the other section of the drum on the other side of the partition 34 and it runs forwardly over a pulley 40 which is carried by a thwart 41 mounted transversely of the bowed portions 13a, 14a of the upper frame.

Snap hooks 42 are carried by the rear ends of the two steel cables 41 and are adapted to snap into eyes 44 screwed or otherwise secured in the stern end of the boat 46. The free end of the forward cable 39 also carries a snap hook 43 adapted to detachably engage an eye 45 secured in the bow end of the boat 46.

In the rear end of the upper frame are chains 47 having dependent snap hooks 48 also adapted to engage the eyes 44 at the stern of the boat. These chains may be welded or otherwise secured at their upper ends to the rear cross rail 16 of the upper frame, as shown in Figure 2.

At the front end is a similar chain 48 welded or otherwise secured to the bow rib 19 and supporting a snap hook 50 adapted to engage the bow eye 45 of the boat.

The trailer when in a standing position may be supported erect by the two pivoted supporting legs 51 at the rear under portions of the trailer and by the single pivoted leg 53 at the bow or front portion. The rear supporting legs 51 are shown as being pivoted to the lower frame at the points 52; while the front leg 53 is pivoted at 54 to one of the bow portions 11a of the lower frame.

It will be noted that the rear cables 31 emerge from the under side of the drum while the forward cable 39 comes off the upper side of such drum. In other words these cables are reversely wound on the drum so that rotation of the drum in one direction will simultaneously wind both cables and rotation in the opposite direction will slacken or pay out such cables 31 and 39. A chain 57 is welded to one of the bow members 14a of the upper frame and carries a snap hook 58 for engaging the handle 37 to prevent the drum from rotating as in the elevated position of the boat shown in Figure 1.

The trailer may be hitched to an automobile by any convenient form of hitch arrangement, preferably by a universal joint connection.

In the use of the device, the trailer may be backed over the boat, the snap hook ends of the cables 31 and 39 drawn down and engaged with the eyes 44 and 45 of the boat 46 as at rest upon the ground directly beneath the space it is shown to occupy in Figure 1. The cables 31 and 39 are then wound upon the drum by the rotation of the drum by the hand wheel 37, the reduction gear 38 reducing the manual effort to accomplish this work. There being no cross bars between the side rails 10 and 11 of the lower frame the boat may be hoisted without interference into the space provided therefor within these skeleton frames, as shown in Figure 1. After the boat is hoisted a snap hook 58 is engaged with handle 37 to prevent the unwinding of the cables and thus to retain the boat elevated in the trailer. In order to take some of this strain off the cables the other snap hooks 48 and 50 are connected with the eyes 44 and 45 of the boat whereby the frame itself takes up part of this load during the transit of the boat from place to place in the trailer.

On arriving at destination the snap hooks 48 and 50 are disconnected, the handle 37 is released and backed slowly in the lowering order of rotation. When the boat 46 has reached the ground the cable snap hooks 42 and 43 are removed and the trailer may be moved forwardly away from its position over the boat, leaving the boat free to be launched.

If desired, the handle 37 may have a ratchet attachment for holding the handle in any desired angular position.

The size of the boat trailer is such that it will accommodate any size boat, adjustability in this respect being had by the use of the perforated cross bars 26 in combination with the pulleys 30. By removing the bolts 28 the pulleys 30 may be moved forwards or rearwards or together or apart to accommodate shorter or longer boats or wider or narrower boats. The spaces between the perforated bars 26 allow for the vertical free ends of the steel cables 31 to descend to engage the boat. The kick-stands or supporting legs 51 and 53 assure a level position of the trailer at all times even when not in use. The kick-stands may be held elevated by any suitable form of detents.

If desirable hooks may be placed at intervals along the lower part of the trailer frame to accommodate the eyelets in a tarpaulin or other covering if such is desired.

It will be understood that the improved trailer provides a top frame adequately strengthened and reinforced thereby completely eliminating the need for cross bars or braces on the bottom of the frame with the exception of those which connect the two frames together. This arrangement leaves the inside of the trailer free to receive the boat in its entire length, thereby enabling the trailer to be backed over the boat whether the boat rests upon the ground or is in the water. By lowering the trailer into the water the boat may be received at perhaps its top possible level which will render the raising of the boat much simpler.

It is obvious that various changes and modifications may be made in the details of construction and design of the above specifically described embodiment of this invention without departing from the spirit thereof, such changes and modifications being restricted only by the scope of the following claims.

What is claimed is:

1. A boat-carrier trailer comprising a framework having an internal space to receive a boat and a base opening through which the boat is received and discharged, boat hoisting mechanism carried by said framework including a windlass and spaced perforated bars, pulleys, bases for the pulleys adapted to rest on said bars, fastening members for the bases adapted to selectively pass through said perforations of the bars, and cables passing over said pulleys one end of which is fastened to said windlass and the other end having means to engage the boat.

2. A boat carrier trailer comprising a lower frame having a base opening through which a boat may be lifted and lowered, an upper frame comprising spaced substantially parallel longitudinal rails bowed at their front portions and meeting together at an apex, supporting means between said lower and upper frames, said lower frame also comprising spaced substantially parallel longitudinal rails bowed at their front portions and meeting together at an apex, both of said upper and lower frames being continuous from their apexes to their bases, both of said apexes and bases being joined by said supporting means, and means to secure the rear end portions of said rails together, the forward portion of said upper frame including said supporting means forming a support for receiving a windlass which together with said support forms a truss for strengthening said upper frame members about their forward portion.

EUGENE T. REID.

REFERENCES CITED

The following references are of record in the file of this patent:

UNITED STATES PATENTS

| Number | Name | Date |
|--------|------|------|
| 821,954 | McCormick | May 29, 1906 |
| 1,531,180 | Erickson | Mar. 24, 1925 |
| 2,260,676 | Lafaye | Oct. 28, 1941 |
| 2,375,754 | Ballinger | May 15, 1945 |
| 2,388,870 | Sackett | Nov. 13, 1945 |
| 2,415,771 | Agtmael | Feb. 11, 1947 |